United States Patent Office 3,025,316
Patented Mar. 13, 1962

3,025,316
THIOPHOSPHORIC ACID ESTERS AND A PROCESS FOR THEIR PRODUCTION

Walter Lorenz, Wuppertal-Vohwinkel, and Gerhard Schrader, Wuppertal-Cronenberg, Germany, assignors to Farbenfabriken Bayer Aktiengesellschaft, Leverkusen, Germany, a corporation of Germany
No Drawing. Filed Oct. 13, 1959, Ser. No. 846,066
Claims priority, application Germany Oct. 18, 1958
4 Claims. (Cl. 260—461)

The present invention relates to and has as its objects new and useful insecticidal thiophosphoric acid esters and their production. Generally the new compounds may be represented by the following formula

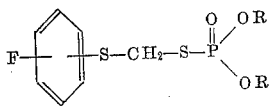

in which R stands for lower alkyl radicals.

Fluorophenyl - mercaptomethyl - dithiophosphoric acid esters are known already from the literature. However, the corresponding monothiophosphoric acid esters are not described as yet and it has been found that this new class of compounds has a particularly good insecticidal action which exceeds that of the known dithiophosphoric acid esters whilst the toxicity is comparatively low.

The new compounds are obtained in a manner known in principle, e.g. by reaction of the corresponding fluorophenyl-mercaptomethyl halides with salts of O.O-dialkyl-thiolphosphoric acids, as it is to be seen from the following equation:

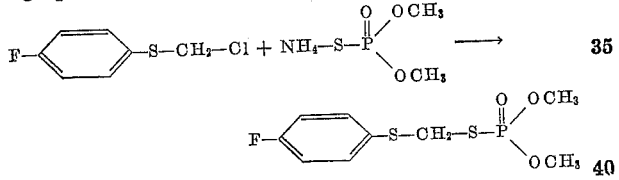

The reaction is preferably carried out in the presence of inert diluents such as alcohols, lower ketones, benzene, toluene and the like, and at a slightly elevated temperature.

The new compounds are applied in a manner known in principle, that is to say in combination with solid or liquid extenders or diluents. Chalk, talc, bentonite, kieselguhr and the like have chiefly proved to be useful as such extenders. If liquid combinations are to be applied, they should preferably consist of aqueous emulsions which are easily obtainable from the above mentioned compounds with the use of suitable auxiliary solvents and commercial emulsifiers.

As an example for the special utility of the inventive compounds the ester of the following formula

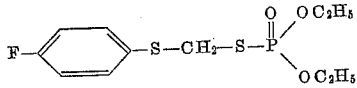

has been tested against spider mites (systemic action). Aqueous solutions of the aforesaid compound have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration.

The test has been carried out as follows: Bean plants of about 7 inches height (*Phaseolus vulgaris*) in pots of about 5 inches diameter are watered with 250 millilitres of an aqueous emulsion as prepared above in a concentration as shown below. The bean plants were heavily infested with the two-spotted spider (*Tetranychus telarius*). The killing rate of the pests has been determined after 48 and 96 hours. 0.1% solutions kill spider mites to 100%.

The following example is given for the purpose of illustrating the production of the new compounds.

*Example*

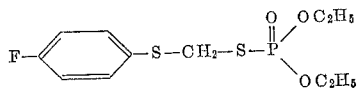

56 grams (0.3 mol) of the ammonium salt of diethyl-thiolphosphoric acid and 44 grams (0.25 mol) of 4-fluorophenyl-mercaptomethyl chloride (B.P. 43° C./0.01 mm. Hg) are warmed in 150 cc. of n-propyl alcohol to 60–70° C. for two hours with stirring. After cooling, the reaction product is poured into water and the precipitated oil taken up with benzene. After washing with water and a sodium bicarbonate solution, the solvent is dried and distilled off. The residual oil (80 grams) distils after slight first runnings at 109° C./0.01 mm. Hg as a pale yellow oil. Yield: 65 grams corresponding to 93.6% of the theoretical.

By the same way but using instead of the ammonium salt of diethyl-thiolphosphoric acid the corresponding equimolecular amount of dimethyl- or diisopropyl-thiolphosphoric acid there are obtained the esters of the following formulae:

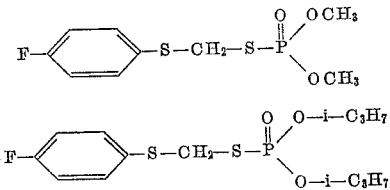

We claim:
1. S - (fluorophenyl - mercaptomethyl) - O.O - di - lower-alkylphosphoric acid esters in which the alkyl group contains up to 4 carbon atoms.
2. The thiophosphoric acid ester of the following formula

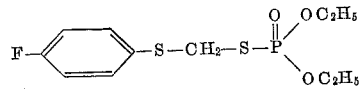

3. The thiophosphoric acid ester of the following formula

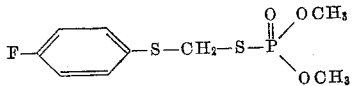

4. The thiophosphoric acid ester of the following formula

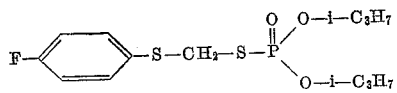

References Cited in the file of this patent
UNITED STATES PATENTS

| | | |
|---|---|---|
| 2,597,534 | Schrader | May 20, 1952 |
| 2,793,224 | Fancher | May 21, 1957 |
| 2,852,549 | Coover et al. | Sept. 16, 1958 |
| 2,891,984 | Gatzi et al. | June 23, 1959 |

FOREIGN PATENTS

| | | |
|---|---|---|
| 772,213 | Great Britain | Apr. 10, 1957 |
| 1,016,260 | Germany | Sept. 26, 1957 |